United States Patent [19]

Brandon

[11] Patent Number: 5,318,844
[45] Date of Patent: Jun. 7, 1994

[54] FIBROUS MAT WITH CELLULOSE FIBERS HAVING A SPECIFIED CANADIAN STANDARD FREENESS

[75] Inventor: Ralph E. Brandon, Newark, Ohio

[73] Assignee: Owens-Corning Fiberglas Technology Inc., Summit, Ill.

[21] Appl. No.: 890,198

[22] Filed: May 29, 1992

[51] Int. Cl.⁵ .................. B32B 9/00; B32B 19/00; D04H 11/00
[52] U.S. Cl. ........................... 428/357; 428/359; 428/362; 428/282; 428/283; 428/284; 428/285; 428/286; 428/288; 428/289; 428/290; 428/291
[58] Field of Search ............... 428/312.6, 312.64, 224, 428/357, 359, 362, 282, 283, 284, 285, 286, 288, 289, 290, 291; 162/157.2, 157.3, 157.4

[56] References Cited

U.S. PATENT DOCUMENTS

| | | | |
|---|---|---|---|
| 3,228,825 | 1/1966 | Waggoner | 162/145 |
| 3,749,638 | 7/1973 | Renaud et al. | 162/145 |
| 3,874,980 | 4/1975 | Richards et al. | 428/312.6 |
| 4,315,967 | 2/1982 | Prior et al. | 428/285 |
| 4,637,795 | 1/1987 | Sales | 428/215 |
| 4,637,951 | 1/1987 | Gill et al. | 428/215 |
| 5,192,604 | 3/1993 | Gaylia | 428/224 |

Primary Examiner—Patrick J. Ryan
Assistant Examiner—Richard P. Weisberger
Attorney, Agent, or Firm—Ted C. Gillespie; Patrick P. Pacella

[57] ABSTRACT

A foam facer mat incorporates a natural short wood pulp fibers to provide dimensional stability to foam insulation for roof insulation. The facer mat also employs chopped glass fibers with the wood pulp.

5 Claims, No Drawings

FIBROUS MAT WITH CELLULOSE FIBERS HAVING A SPECIFIED CANADIAN STANDARD FREENESS

TECHNICAL FIELD

This invention relates fibrous mats. It also relates to composites having a foam core with at least one fibrous mat thereon.

BACKGROUND ART

Fibrous, non-woven fabrics, mats, and papers have found particular utility for providing dimensional stability, fire resistance and flexural strength. The use of glass fibers in paper making has long been known. Glass fiber paper was produced on production equipment as early as the 1930's. Since that time, very fine blown microfibers, glass fibers and even glass flakes have been used to produce specialty papers. These papers have been produced in all-glass form and in ad-mixes with cellulose, and other fibers. The use of micro-fibers and glass fibers alone or in combination with other fibers for high temperature filtration or controlled porosity is disclosed in the prior art. Also disclosed, is the use of glass fibers and wood pulp to control dimensional stability. Composites panels having foam cores with fibrous mats on one or opposite surfaces of the core also are known. Roofing insulation often embodies a composite panel comprising an organic foam core with an inorganic fibrous mat on the upper and lower surface thereof. The industry refers to the mats as "foam facer mats" and refers to the composites as "rigid foam insulation."

I have invented a new foam facer mat which uses a blend of glass fibers and wood pulp fibers to control the porosity of the mat. The amount of cellulose fiber required to achieve the desired low mat porosity is strongly influenced by the cellulose fiber length and the degree of fibrillation of the cellulose fiber. An accepted measure of cellulose fiber length/fibrillation is the "Canadian Standard Freeness" of the pulp.

Many closed-cell organic or plastic foams particularly polyurethanes, have excellent insulating properties. However, such foams are commonly lacking in dimensional stability particularly when subjected to non-uniform temperatures. In addition, the facings required in the manufacturing process can exacerbate these tendencies. Such characteristics have rendered these organic foams less than suitable for roof insulation particularly when placed on layers of hot asphalt applied on the underlying roof structure and when hot asphalt is applied over the foam.

By employing layers of inorganic fibers on one or both major surfaces of a foam core or slab, the changes in dimensions of the foam in aging tests are reduced to a small percentage of the former changes encountered. The inorganic fibers employed are preferably glass fibers, having high strength and a high modulus of elasticity, and at least one of the layers of fibers preferably is in the form of an nonwoven mat, being randomly disposed in a plane parallel to the core.

An effective method of achieving the structural integrity is to place the fibrous layers in contact with the foam forming the core during foaming so that the foam will tend to penetrate interstices in the fibrous layers to form an interlocking inter-face therebetween. For this purpose, a suitable organic foam mixture can be applied to one of the fibrous layers with the other fibrous layer then placed on the foaming mixture and backed up or supported so that it will not be able to move completely freely outwardly from the first fibrous layer as the mixture foams. This achieves penetration by the foam into both layers. The inorganic facings restrain dimensional changes in the foam when subjected to changes in temperature and moisture. This substantially reduces warping and cell rupture of the foam.

More specifically, the first fibrous layer can be moved in a flat, supporting position on a belt-type conveyor above which is suitable mixing apparatus and a nozzle or nozzles, the nozzle(s) evenly distributing the foam mixture onto the first fibrous layer. The second fibrous layer is then directed onto the foam mixture, preferably after the foaming has commenced. A second belt-type conveyor is then disposed above a portion of the first conveyor a predetermined distance, with the second conveyor backing up and restricting upward movement of the second fibrous layer as foaming of the mixture moves the second layer upwardly. A composite panel thereby results consisting of the organic foam core or slab and the two fibrous layers located in substantially parallel relationship, with this panel being cut or shaped to any desired size and predetermined configuration.

Specifically for use in roof installation, a polyurethane foam slab is employed having a mat of fibers on the upper surface thereof and a layer of fibers on the lower surface. The lower layer can be in the form of a board of fibers or a mat of them, similar to the mat on the paper surface of the slab. Whether the bottom surface is thicker board or a thinner mat depends primarily on the nature of the underlying roof structure and whether or not the roof insulation must be fire retardant or resistant. In either case, the core with the inorganic fibrous layers on the surfaces produces a balanced system which has many advantages over insulating structures heretofore known, particularly in achieving dimensional stability with reduction in warping and cell rupture of the foam.

The use of chopped glass fibers is well known. The chopped glass is produced in the form of individual strands which are sized, gathered into rovings and chipped to a desired length. Various fiber diameters have been evaluated with K×½" being preferred on a cost effectiveness basis. K fibers refers to the diameter of each filaments and is 13.5 micro meters. Glass fibers used in the practice of this invention can be, but are not restricted to "E" glass fibers, well known to those skilled in the art. Such fibers are described in U.S. Pat. No. 2,334,961.

The facers described in the disclosure relies on two types of physical attributes to obtain "foam hold-out", i.e. control foam bleed through.

The pore structure of the mat which is controlled by the fiber input to a large extent and is defined by the air-permeability of the mat.

The low surface energy of the binder system which is achieved through the use of a fluorocarbon "antiwetting" agent. The low surface energy prevents the foam from wetting the surfaces of the pores. Smaller pores do not require as low a surface energy to prevent wetthrough of the mat as do larger pores.

The Canadian Standard Freeness (CSF) is a measure of how "slow" a paper stock is, i.e., how much the stock retards the drainage of water during the forming of the stock into a paper web. The lower the CSF the more closed and dense the paper structure. The CSF is controlled by both the length of the fiber and the degree of fibrillation of the fiber.

The structures of my invention have an air-permeability of less than 150 cubic feet per minute per square foot (CFM/SF). When using air through drying systems a practical lower limit of mat air-permeability is 50 CFM/SF as below 50 CFM/SF, the structure is too dense for practical drying. Generally, the mat has an air permeability ranging from 50 to 150 CFM/SF.

The foam facer mats that make use of the fluorocarbon anti-wetting agent are acceptable for mechanically fastened and ballasted roofing systems, but at this time are not considered acceptable for fully adhered systems. Apparently, the fluorocarbon antiwetting agent changes the foam cell structure right below the facer such that even though the 90 degree pull, facer adhesion test is "good" the facer can be peeled off the underlying board when the force is applied so a shear is applied to the foam cell structure. Shear loads can be applied to the facer/foam interface by stress induced by temperature changes seen in normal use as well as various kinds of "application" damage.

DETAILED DESCRIPTION OF THE INVENTION INCLUDING THE BEST MODE OF CARRYING IT OUT

The foam facer mat is a blend of textile glass fibers and specific wood pulp to control porosity. The two fibers are blended together in a wet-laid mat using a standard UF - acrylic binder as follows:

| | |
|---|---|
| Fiber input | 55 to 65% K × ¼ inch chopped textile glass fiber and 35 to 45% Neutracel III, (Hammermill Div. of International Paper Co.) a bleached northern hardwood soda pulp. With the preferred blend being 58% K × ¼ inch and 42% Neutracel. |
| Binder | B017A (1100, white) or B017B (1120, black) at an add-on of 30% binder. |
| Basis Weight | 1.45 lb/CSF |
| The total composition of the mat is as follows: | |
| Glass fiber | 38 to 46% (preferred 41%) |
| Wood pulp | 24 to 32% (preferred 29%) |
| Binder | 22 to 38% (preferred 30%) |

The Neutracel III is a northern hardwood (maple, oak, cherry, beech and birch) pulp that has a large number of small fibers (0.7 mm average length, initial Canadian Standard Freeness of 515) and hence generates a very dense, closed structure relative to an unrefined southern pine kraft pulp such as Supersoft (International Paper Co.) with an average fiber length of 2.2 mm and initial CSF of 750. As an example, a 50% K and 50% Supersoft furnish and a mat basis weight of 1.43 lb/csf yields an air-permeability of 284 CFM/SF and thickness of 20.0 mil while a 53% K and 47% Neutracel furnish at a basis weight of 1.43 lb/csf yields an air-permeability of 63 CFM/SF and a thickness of 14.2 mil.

If the southern pine pulp is refined to shorten the fiber length and fibrillate the fibers, denser mats can be produced which are similar to those obtained with northern hardwood pulps. For example, if a mat is produced from a furnish of 50% K and 50% recycled corrugated boxes (Kraft liner and semi-chemical corrugating medium, CSF of about 600) at a basis weight of 1.46 lb/csf an air-permeability of 127 CFM/SF and a thickness of 15.8 mil is obtained.

If a wood pulp is utilized that requires refining, the degree of refining must be controlled in order to obtain consistent mat properties. As the Canadian Standard Freeness of the wood pulp is reduced, either by selecting naturally short fiber or by refining the cellulose fiber, the mat produced becomes more and more two sided.

The highly two sided sheet that results from using low CSF pulps has a positive aspect. The very open wire side is next to the foam and allows the foam to penetrate part way (half or more of the facer thickness) into the facer. This results in excellent facer adhesion and foam surface reinforcement. Half or less of the facer thickness, however, is available to resist foam bleed-through, hence the need for a very closed mat. The cellulose fibers I use have a CSF ranging from 300 to 750.

Regardless of the CSF of the wood pulp used, the mechanism of foam hold-out is similar in that the wood pulp reduces the average pore size and increases the tortuosity of the path that the foam must follow to get from the "application side" to the "out-side" of the finished board. The longer stiffer soft wood fibers yield thicker, more open mat so path tortuosity is much more important in obtaining good foam hold-out than it is with the dense, thin mats produced from the northern hardwood. This is indicated by the fact that the "foam bleed-through" rating for Supersoft containing mats is a function of both the air-permeability *and* the mat thickness, whereas the bleed-through rating of Neutracel containing mats is a function of only the air-permeability (porosity).

The short fibered Neutracel pulp offers three advantages over the unrefined, long fiber Supersoft pulp in that (1) its less expensive and less is required; (2) since thickness is not critical, varying machine conditions have less of an effect on mat acceptability; and (3) short wood pulp fibers can also be obtained from recycled pulp which offers cost reduction possibilities without major changes in the mat structure.

Besides controlling mat porosity and hence foam bleed through, the inclusion of wood pulp in the mat structure offers the opportunity for the mat to be static dissipative, i.e., be able to bleed off a static charge. Current all glass facers are insulative (surface resistivity >10 to 12th ohms per square). The product containing 50% Supersoft was tested to be static dissipative (surface resistivity >10 to the 12th ohms per square) whereas the facers containing lower levels of Neutracel were insulative. The factor pushing the mat structure towards being a static dissipative is the flammable solvents used in fully adhered membrane roofing systems and the perimeter adhering in some ballasted systems. Flash fires during application of such systems have occurred. While the source of the spark may or may not have been documented, any reduction in the potential for such an occurrence becomes a product attribute.

Relative to critical parameters for the foam facer mat, if short fiber wood pulps are used with K filament textile glass, a mat air-perm of 130 CFM/SF or less is required. The short fiber wood pulps will have a Canadian Standard Freeness (CSF) of about 400–600 units. If a high (750) CSF pulp is used, the air-permeability must be about 250 with a mat thickness of at least 19 mil. The resulting mat will have a surface resistivity of $K10^{12}$ ohms/square and a charge decay of <2 sec.

INDUSTRIAL APPLICABILITY

In producing the roof insulation system, a layer of hot, molten asphalt is first applied to the underlying roof structure or roof deck with the foam slab and glass fiber layers on the surfaces thereof then placed as composite panels on the hot asphalt. Such asphalt may be applied at a temperature of 350.F. or higher and would cause the foam slab, if used alone, to warp upwardly. After the composite panels are in place, glass fiber tape is frequently applied to the joints of the insulation, on the upper mats of the glass fibers. A layer of asphalt again is applied to this upper surface with this layer attacking the foam if used without the upper fibrous mat. Another fibrous mat is then applied to the upper asphalt layer with additional layers of asphalt and fibrous mats further applied, as desired. The upper layer is either a final layer of asphalt with or without gravel applied thereon or a layer of fiber mat with granules embedded in the upper surface.

Alternately, single-ply membranes can be used which may be mechanically adhered or ballasted systems. Fully adhered single-ply membranes roofing systems have not been qualified to date.

I claim:

1. Fibrous, non-woven structures comprising a mixture in percentages by weight of:

| | |
|---|---|
| chopped glass fibers | 38 to 46 |
| cellulose fibers having a Canadian standard freeness of 300 to 750 | 24 to 32 |
| binder | 22 to 38 | wherein the cellulose fibers are bleached northern hardwood soda pulp or refined, fibrillated southern pine kraft pulp; and wherein the structures have an air-permeability ranging from 50 to 150 CFM/SF.

2. Structures according to claim 1 wherein the cellulose fibers have a Canadian standard freeness of 400–600.

3. Structures according to claim 1 having a fiber input of 45 to 65 weight percent inorganic fibers and 35 to 55 weight percent cellulose fibers.

4. Structures according to claim 1 having a fiber input of 58 weight percent inorganic fibers and 42 weight percent cellulose fibers.

5. Glass fiber, non-woven mats comprising of a mixture in percentages by weight of:

| | |
|---|---|
| chopped glass fiber | 41 |
| wood pulp fiber having a Canadian standard freeness of 475 to 525 | 29 |
| binder | 30 | wherein the wood pulp fibers are bleached northern hardwood soda pulp and the mats are very dense closed mats having an air-permeability ranging from 50 to 150 CFM/SF.

* * * * *